(12) United States Patent
Steinglass et al.

(10) Patent No.: US 8,082,274 B2
(45) Date of Patent: Dec. 20, 2011

(54) SCHEDULING APPLICATION ALLOWING FREEFORM DATA ENTRY

(75) Inventors: Alice Pritikin Steinglass, Redmond, WA (US); Peter de Vries, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 299 days.

(21) Appl. No.: 11/770,702

(22) Filed: Jun. 28, 2007

(65) Prior Publication Data
US 2009/0006430 A1 Jan. 1, 2009

(51) Int. Cl.
G06F 7/00 (2006.01)
G06F 17/30 (2006.01)
G06F 17/00 (2006.01)
G06F 17/20 (2006.01)
G06F 17/21 (2006.01)
G06F 17/22 (2006.01)
G06F 17/24 (2006.01)
G06F 17/25 (2006.01)
G06F 17/26 (2006.01)
G06F 17/27 (2006.01)
G06F 17/28 (2006.01)

(52) U.S. Cl. ........ 707/793; 707/802; 707/803; 707/805; 707/807; 715/221; 715/222; 715/224; 715/227

(58) Field of Classification Search ................. 707/100, 707/791, 793, 802, 803, 805, 807; 715/221, 715/222, 224, 227
See application file for complete search history.

(56) References Cited

U.S. PATENT DOCUMENTS

| | | | |
|---|---|---|---|
| 5,907,829 A | 5/1999 | Kida | |
| 6,138,141 A | 10/2000 | DeSimone et al. | |
| 6,154,753 A | 11/2000 | McFarland | |
| 6,424,983 B1 * | 7/2002 | Schabes et al. | 715/257 |
| 6,442,567 B1 * | 8/2002 | Retallick et al. | 1/1 |
| 6,687,678 B1 | 2/2004 | Yorimatsu | |
| 6,839,722 B2 | 1/2005 | Buchner | |
| 6,889,196 B1 * | 5/2005 | Clark | 705/7.12 |
| 6,901,407 B2 | 5/2005 | Curns et al. | |
| 6,944,622 B1 | 9/2005 | Mitchell et al. | |
| 7,194,695 B1 * | 3/2007 | Racine et al. | 715/780 |
| 7,249,042 B1 | 7/2007 | Doerr | |
| 7,305,392 B1 * | 12/2007 | Abrams et al. | 1/1 |

(Continued)

FOREIGN PATENT DOCUMENTS

WO WO 2010-135122 A2 11/2010

OTHER PUBLICATIONS

International Search Report and Written Opinion for PCT/US2008/065993 mailed Nov. 12, 2008, 10 pages.

(Continued)

*Primary Examiner* — Rehana Perveen
*Assistant Examiner* — Mark Hershley
(74) *Attorney, Agent, or Firm* — Merchant & Gould P.C.

(57) ABSTRACT

A project management application provides an environment in which a user can transform a project sketch, which is based on mostly "freeform" data, into a defined project plan. The project management application facilitates the mixture of freeform task attribute values with structured attribute values of one or more project tasks. The project management application can utilize an internal calculation model to manage the relationships between task attribute values despite accepting freeform values for task attributes. The project management application calculates the attribute values to the extent allowed by the calculation model's recognition of the attribute values.

20 Claims, 15 Drawing Sheets

U.S. PATENT DOCUMENTS

| | | | |
|---|---|---|---|
| 7,415,393 B1 * | 8/2008 | Pena-Mora et al. | 703/1 |
| 2001/0029460 A1 | 10/2001 | Yonemitsu | |
| 2003/0046220 A1 * | 3/2003 | Kamiya | 705/37 |
| 2004/0054566 A1 * | 3/2004 | J'Maev | 705/7 |
| 2005/0080715 A1 * | 4/2005 | McHale et al. | 705/37 |
| 2005/0138631 A1 * | 6/2005 | Bellotti et al. | 719/310 |
| 2005/0160084 A1 | 7/2005 | Barrett | |
| 2005/0197999 A1 * | 9/2005 | Kumar | 707/1 |
| 2005/0216111 A1 | 9/2005 | Ooshima | |
| 2005/0278208 A1 | 12/2005 | Schultz | |
| 2006/0004618 A1 * | 1/2006 | Brixius | 705/8 |
| 2006/0029079 A1 | 2/2006 | Cohen | |
| 2006/0070019 A1 | 3/2006 | Vishnumurty | |
| 2006/0070020 A1 | 3/2006 | Puttaswamy et al. | |
| 2006/0136241 A1 | 6/2006 | De Vries | |
| 2006/0140192 A1 | 6/2006 | Jain | |
| 2006/0200372 A1 * | 9/2006 | O'Cull et al. | 705/8 |
| 2006/0235690 A1 | 10/2006 | Tomasic et al. | |
| 2006/0293939 A1 | 12/2006 | Sun et al. | |
| 2007/0055688 A1 | 3/2007 | Blattner | |
| 2007/0083552 A1 | 4/2007 | Allen et al. | |
| 2007/0245300 A1 * | 10/2007 | Chan et al. | 717/105 |
| 2008/0141145 A1 | 6/2008 | Klausmeier | |
| 2008/0228739 A1 * | 9/2008 | Motoyama et al. | 707/4 |
| 2009/0048896 A1 * | 2/2009 | Anandan | 705/9 |
| 2010/0010856 A1 * | 1/2010 | Chua et al. | 705/8 |
| 2010/0299171 A1 * | 11/2010 | Lau et al. | 705/8 |

OTHER PUBLICATIONS

Oracle Project Management; http://www.oracle.com/applications/project-management.html: admitted by Applicants as prior art as of Jun. 27, 2007; pp. 1-5.

Meyers et al.; PASSAT: A User-centric Planning Framework; 2002; pp. 1-10.

Applied Software Project Management; Copyright 2005, 3 pages.

View and Track Scheduling Factors; Copyright 2009, 4 pages.

WBS Chart Pro 4.7; Copyright 2009, 7 pages.

International Search Report and Written Opinion issued in PCT/US2010/034618 mailed Dec. 1, 2010 (326950-02).

* cited by examiner

| NAME | FF | START DATE | END DATE | DURATION |
|---|---|---|---|---|
| TASK 1 | N | 01/01/07 | 01/02/07 | 2 DAYS |

(T2)

| NAME | FF | START DATE | END DATE | DURATION |
|---|---|---|---|---|
| TASK 1 | N | 01/01/07 | 01/02/07 | 5 DAYS |

(T3)

| NAME | FF | START DATE | END DATE | DURATION |
|---|---|---|---|---|
| TASK 1 | N | 01/01/07 | 01/05/07 | 5 DAYS |

| NAME | FF | START DATE | END DATE | DURATION |
|---|---|---|---|---|
| TASK 2 | N | 01/01/07<br>01/01/07 | 01/02/07<br>01/02/07 | 2 DAYS<br>2 DAYS |

(U2)

| NAME | FF | START DATE | END DATE | DURATION |
|---|---|---|---|---|
| TASK 2 | N | 01/01/07<br>01/01/07 | 01/02/07<br>01/02/07 | 5 DAYS<br>5 DAYS |

(U3)

| NAME | FF | START DATE | END DATE | DURATION |
|---|---|---|---|---|
| TASK 2 | N | 01/01/07<br>01/01/07 | 01/02/07<br>01/05/07 | 5 DAYS<br>5 DAYS |

| NAME | FF | START DATE | END DATE | DURATION |
|---|---|---|---|---|
| TASK 3 | Y | 01/01/07<br>default | 01/05/07<br>default | 1 DAY<br>default |

(V2)

| NAME | FF | START DATE | END DATE | DURATION |
|---|---|---|---|---|
| TASK 3 | Y | 01/01/07<br>01/01/07 | 01/05/07<br>01/01/07 | 1 DAY<br>1 DAY |

| NAME | FF | START DATE | END DATE | DURATION |
|---|---|---|---|---|
| TASK 4 | Y | FY 07<br>default | 12/31/07<br>default | 6 MONTHS<br>default |

(W2)

| NAME | FF | START DATE | END DATE | DURATION |
|---|---|---|---|---|
| TASK 4 | Y | FY 07<br>06/30/07 | 12/31/07<br>12/31/07 | 6 MONTHS<br>6 MONTHS |

SCHEDULING APPLICATION ALLOWING FREEFORM DATA ENTRY

BACKGROUND

A user wishing to create a project plan may utilize a project management application, such as MICROSOFT® Office Project 2007, available from Microsoft Corporation of Redmond, Wash. Generally, project management applications help users to define project goals, to plan tasks and allocate resources, to display a project plan including a schedule, and to carry out and manage projects.

A project plan is composed of tasks. The schedule defines the sequence in which the tasks occur, the resources needed to complete each task, and calendar information pertaining to the tasks. Each task is defined to include one or more attributes (e.g., scheduled dates, task length, cost, etc.). In general, the user outlines a project plan by assigning values to the attributes of each task.

Advantageously, some project management applications provide a calculation model to track the relationship between different tasks and task attributes. The calculation model can compute the value of one or more task attributes automatically based on values assigned to other task attributes. For example, MICROSOFT® Office Project 2007 can calculate a project duration value based on a project start date and a project end date. These types of calculations generally are based on domain specific knowledge about project scheduling (e.g., number of work hours in a day, number of work days in a week, etc.) built into the calculation model.

One limitation of some of these project management applications is the rigidness of the user interface, which inhibits the ability of the user to "sketch out" a project using "fuzzy" task attribute values. These project management applications force users to enter attribute values meeting certain requirements. For example, the user can be required to enter values meeting recognition conditions (e.g., dates must be entered in an mm/dd/ccyy format to be recognized as dates). The user also can be required to enter values meeting predetermined logical conditions (e.g., a project start date must occur after a project end date).

A user who is only trying to get the general idea of how a project will sketch out, or whose initial goal is only to get a particular visualization for a report, may be frustrated by the level of detail required to create a project plan.

It is with respect to these and other considerations that the present invention has been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

A project management application provides an environment in which a user can transform a project sketch, which is based on mostly "freeform" or "fuzzy" data, into a defined project plan.

According to aspects, the project management application enables the creation of one or more tasks, each task having one or more attributes. The project management application facilitates the mixture of freeform attribute values (i.e., values not meeting recognition and/or logical conditions) with structured attribute values (i.e., values meeting the recognition and logical conditions) within at least one task.

According to other aspects, the project management application can utilize an internal calculation model to manage the relationships between task attribute values despite accepting freeform values for task attributes. The project management application calculates the attribute values to the extent allowed by the application's recognition of the attribute values.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 12 depicts the results of modifying a structured task in accordance with the principles of the present disclosure;

FIG. 13 depicts the results of modifying a freeform task in accordance with the principles of the present disclosure;

FIG. 14 depicts the results of entering unrecognizable values for freeform attributes in accordance with the principles of the present disclosure; and FIG. 15 depicts the results of entering logically inconsistent values for freeform attributes in accordance with the principles of the present disclosure.

DETAILED DESCRIPTION

In the following detailed description, references are made to the accompanying drawings that form a part hereof, and in which are shown by way of illustrations specific embodiments or examples. While the disclosure will be described in the general context of program modules that execute in conjunction with an application program that runs on an operating system on a computer system, those skilled in the art will recognize that the disclosure also may be implemented in combination with other program modules. The embodiments described herein may be combined and other embodiments may be utilized without departing from the spirit or scope of the present disclosure. The following detailed description is therefore not to be taken in a limiting sense, and the scope of the invention is defined by the appended claims and their equivalents.

Embodiments of the present disclosure provide an environment in which a user can create a project sketch based at least in part on freeform input data. For the purposes of this disclosure, the term "freeform input" indicates input not meeting recognition and/or logic requirements of the respective task attribute. Over time, the user can transform the project sketch into a defined project plan having structured input data. For the purposes of this disclosure, the term "structured input" indicates input meeting the recognition and logic requirements of the respective task attribute.

Figure 1:
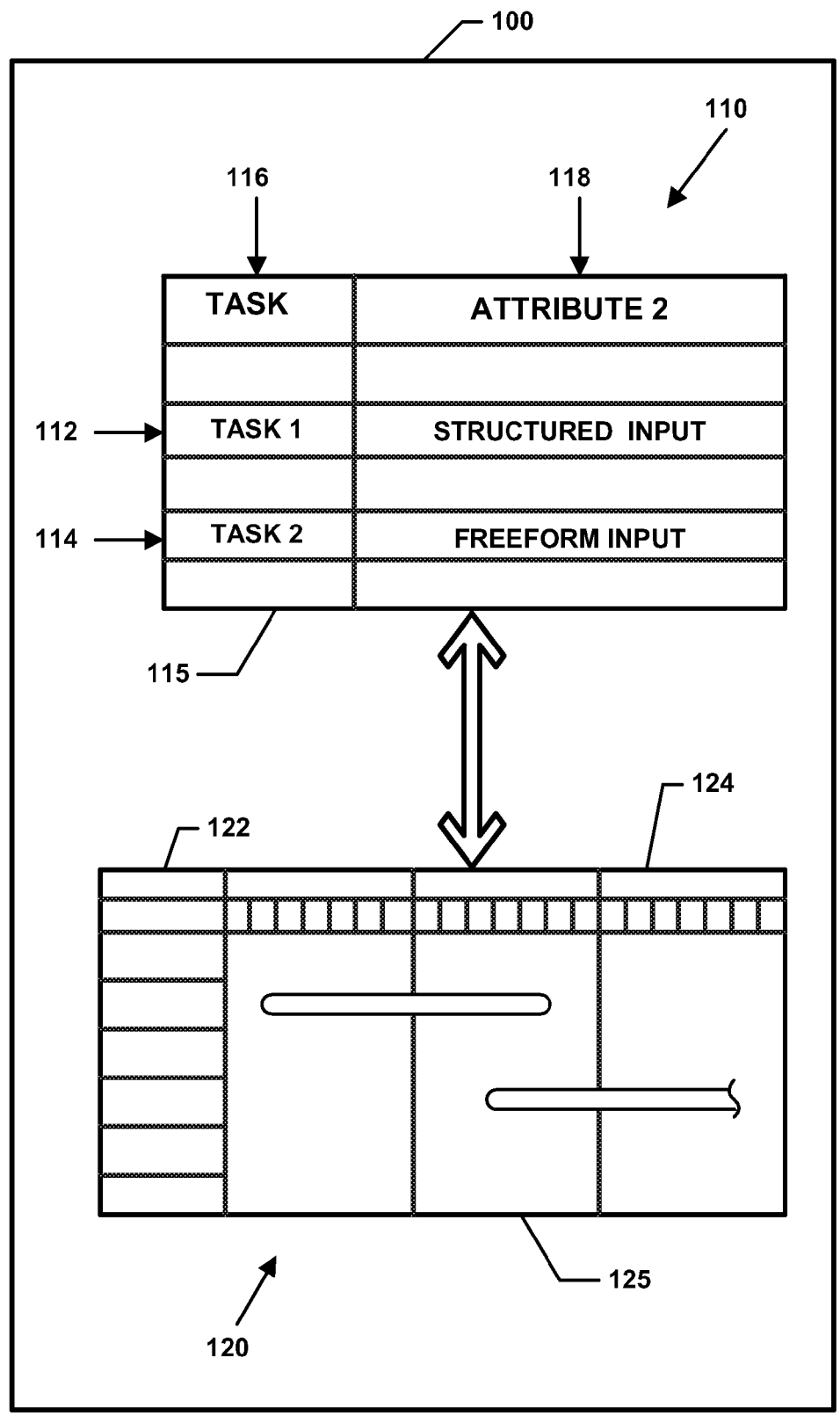
FIG. 1 is a block diagram illustrating an exemplary environment for practicing embodiments of the present disclosure.

FIG. 1 illustrates an example project management environment 100 having features that are examples of inventive aspects of the disclosure. The project management environment 100 includes an input field 110 and a display field 120. A user creates and edits a project plan by interacting with at least one of the input field 110 and the display field 120. For example, the user can create new tasks by adding tasks to the input field 110 and assigning attribute values to the tasks. The user also can edit existing tasks by changing the attribute values of the task.

The input field 110 includes a table (i.e., or spreadsheet) 115 having rows and columns. The rows of the table 115 designate specific tasks and the columns designate the attributes of each task (e.g. task name, task duration, start time and date, finish time and date, cost, etc.). For example, in FIG. 1, a first row 112 designates a first task having a name attribute assigned the value "TASK 1" (in a first column 116) and a second attribute assigned structured input (in a second column 118). The second row 114 designates a second task having a name attribute assigned the value "TASK 2" (in the first column 116) and a second attribute assigned freeform input (in the second column 118). In other embodiments, however, this arrangement of rows and columns can be reversed.

The display field 120 organizes the data entered into the input field 110 and presents at least some of the data to the user. Generally, the display field 120 organizes the data into a graphical format to facilitate comprehension by the user. For example, in FIG. 1, the display field 120 presents the data to the user as a Gantt chart 125. A Gantt chart 125 shows a list 122 of tasks on one side of the chart 125, and a bar chart 124 on the opposite side of the chart 125. In an embodiment, the list 122 of tasks includes the spreadsheet 115 of input field 110.

The bar chart 124 graphically shows the task information on a timescale defined by the user. For example, in FIG. 1, a first bar 126, representing the first task entered in the table 115, extends across a calendar display to indicate the duration of the task relative to the start date and end date of the task. A second bar 128, representing the second task entered in the table 115, also extends across the calendar display. The second bar 128, however, is depicted as incomplete since the second task is defined at least partially with freeform input data. In other embodiments, such a task alternatively can be omitted from the display field 120, especially if insufficient recognizable data is provided by the user to define the task.

In certain embodiments, a user can interact directly with the display field 120 to edit tasks. For example, the user can drag the end of a bar 126, 128 of a Gantt chart 125 to different start dates or end dates on the calendar display to change the corresponding attribute values of the task. Changes in attribute values on the display field 120 can be incorporated into the input field 110.

In other embodiments, the display field 120 can include a line graph, a calendar display, a PERT (Program, Evaluation, Review, Technique) chart, or any other suitable display. Additional information regarding displaying a project plan as a Gantt chart or as a PERT chart can be found in U.S. Pat. No. 5,745,110, issued Apr. 28, 1998, the disclosure of which is hereby incorporated by reference herein.

In general, a project management environment having features that are examples of inventive aspects in accordance with the principles of the disclosure can be implemented on a computing system (e.g., a personal computer, a server computer, a notebook computer, a PDA, a Smartphone, or any other such computing device). A non-limiting embodiment of a computing system 200 configured to implement a project management environment, such as the project management environment 100 of FIG. 1, is described herein with reference to FIG. 2.

Figure 2:
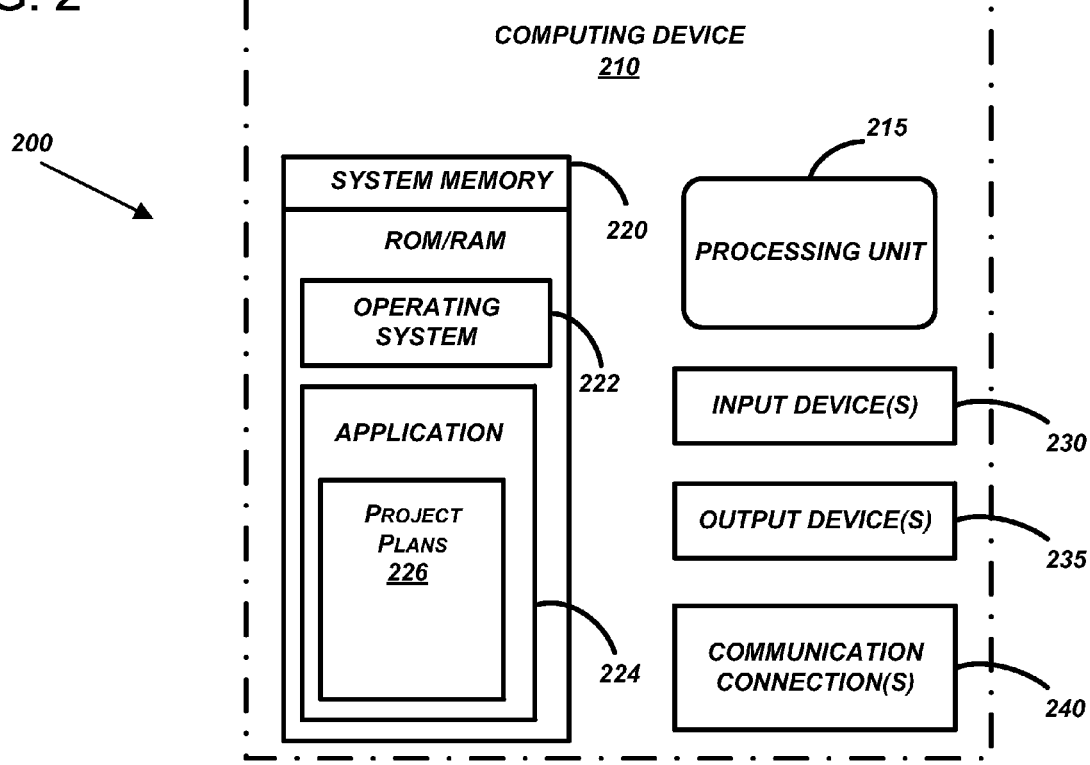
FIG. 2 illustrates one exemplary system for implementing the disclosure including a computing device.

In FIG. 2, the exemplary computing system 200 for implementing the disclosure includes a computing device, such as computing device 210. In a basic configuration, the computing device 210 typically includes at least one processing unit 215 for executing programs stored in system memory 220.

Depending on the exact configuration and type of computing device 210, the system memory 220 may include, but is not limited to, RAM, ROM, EEPROM, flash memory, CD-ROM, digital versatile disks (DVD) or other optical storage devices, magnetic cassettes, magnetic tape, magnetic disk storage or other magnetic storage devices, or other memory technology.

System memory 220 typically includes an operating system 222, such as the WINDOWS® operating systems from MICROSOFT CORPORATION of Redmond, Wash., suitable for controlling the operation of the computing device 210. The system memory 220 also may include one or more software applications, such as client applications 224 for creating and editing project plans 226. One non-limiting example of a client application 224 suitable for creating project plans 226 in accordance with the principles of the present disclosure is MICROSOFT® OFFICE PROJECT 2007 from MICROSOFT CORPORATION of Redmond, Wash.

Computing device 210 also may have input device(s) 230, such as a keyboard, mouse, pen, voice input device, touch input device, etc., for entering and manipulating data. Output device(s) 235, such as a display screen, speakers, printer, etc., also may be included. These output devices 235 are well known in the art and need not be discussed at length herein.

The computing device 200 may contain communication connections 240 that allow the device 200 to communicate with other computing devices, for example, over a network in a distributed computing environment (e.g., an intranet or the Internet). By way of example, and not limitation, communication device media includes wired media such as a wired network or direct-wired connection, and wireless media, such as acoustic, RF, infrared and other wireless media.

Figure 3:
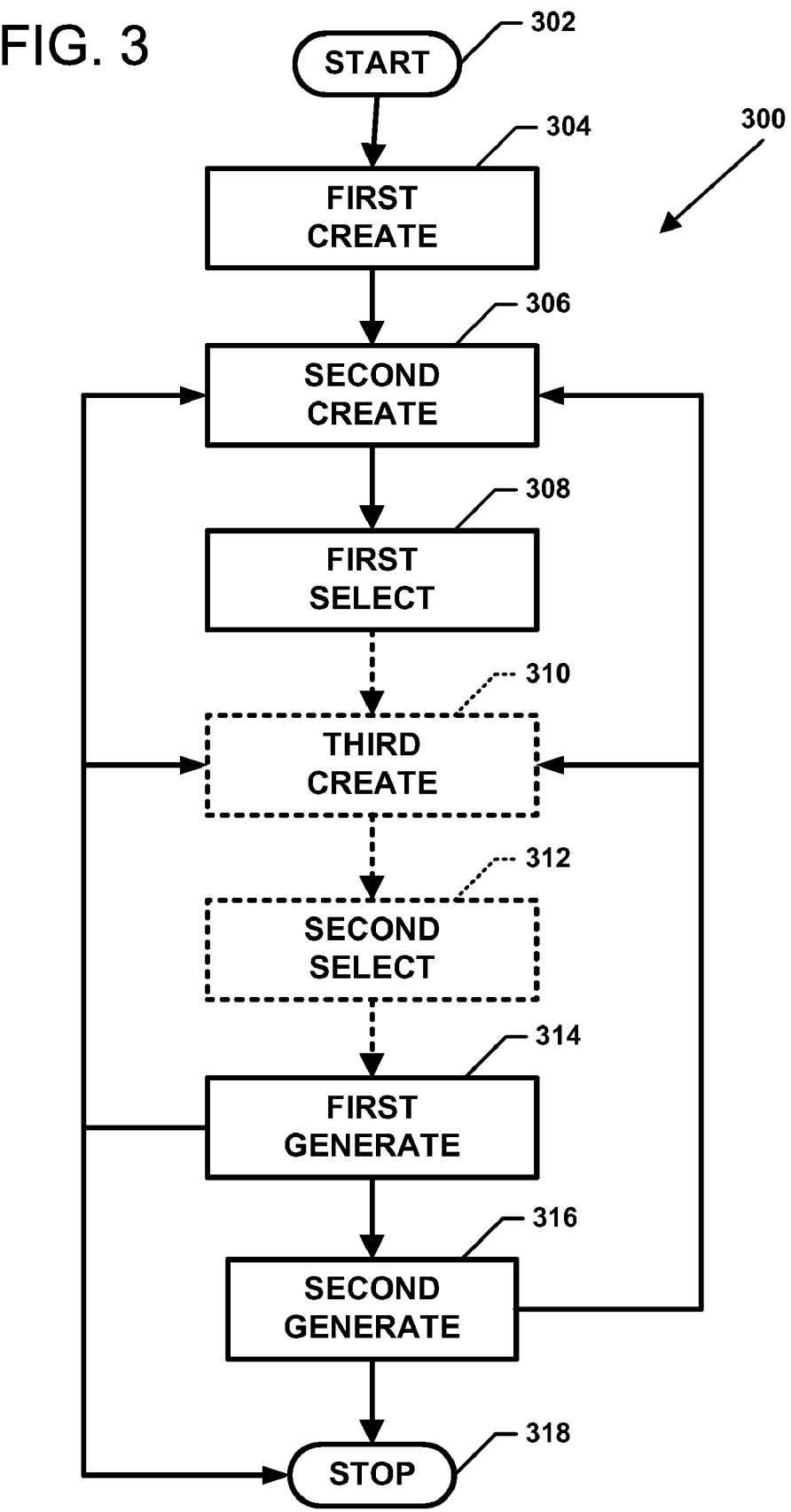
FIG. 3 illustrates a flowchart depicting a creation process to generate a project plan, the creation process being performed in accordance with the principles of the present disclosure.
Figure 4:
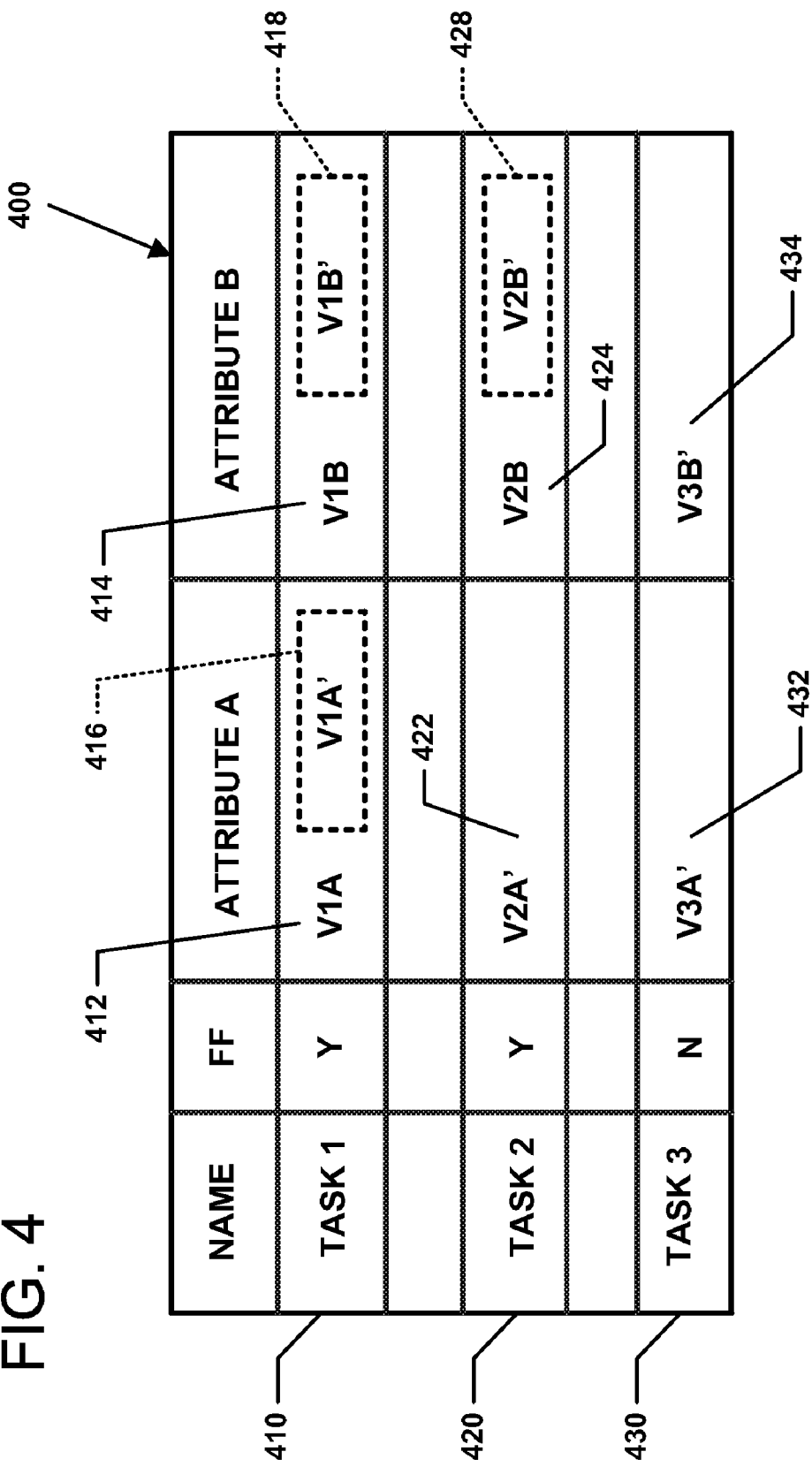
FIG. 4 illustrates a schematic diagram of a project plan showing first and second data fields storing attribute values of tasks in accordance with the principles of the present disclosure.

With reference to FIGS. 3 and 4, a user can create a project plan based at least partially on freeform data within a project management environment, such as environment 100 of FIG. 1. FIG. 3 illustrates a flowchart depicting an operation flow for a generation process 300 by which a project plan can be formed. A schematic illustration of an example project plan, which can be created using the generation process 300, is shown in FIG. 4.

The generation process 300 initializes and beings at a start module 302 and proceeds to a first create operation 304. The first create operation 304 generates a new project data object, such as project data object 400, at the request of a user. The first create operation 304 can generate a project data object having attributes assigned values based on initial project data entered by the user. For example, the first create operation 304 can assign a project start date received from the user to the project data object. The user also can select a calculation model on which the project data object should be based. Alternatively, the first create operation 304 can generate a new project data object based on a template or on another project data object.

A second create operation 306 creates a task to define further the project data object. Typically, the second create operation 306 generates a task having default attributes. For example, the second create operation 306 can generate a task having a start date, and end date, and duration. In other embodiments, however, the second create operation 306 generates a task having no default attributes.

One or more tasks 306 can be designated as being related to one another (e.g., via one or more relationship attributes). For example, a task can have a predecessor attribute identifying one or more parent tasks and/or a successor attribute identifying one or more child tasks. Similarly, attributes within a task can be interrelated. Values of interrelated attributes typically are interdependent so that changing the value of one attribute will affect the value of the related attributes. For example, the duration of a task can be calculated based on the start date and the end date of the task. Changing the end date, therefore, also can change the duration of the task.

A select operation 308 provides an opportunity for the user to choose whether each task will be a freeform task capable of accepting freeform input or a structured task requiring structured input. A structured task aids the user in creating a project plan by preventing the user from entering inconsistent, illogical, or unrecognizable data as a value for any task attribute. Allowing the user to designate such tasks advantageously provides the user with a degree of certainty that the user will not create an impossible task or an inconsistent project schedule. For example, a structured task will not allow the user to plan for forty hours of work to be performed by a single person within a twenty-four hour period.

Alternatively, a freeform task can include one or more attributes capable of accepting any data the user desires to assign to the attribute, whether or not the data is inconsistent, illogical, or even unrecognizable to the calculation model of the project data object. Typically, the calculation model does not change this user input data to correct the inconsistency, even after related data that would otherwise impact the attribute value is changed. Allowing the user to designate such tasks advantageously provides the user with a degree of freedom to sketch out project plans even when the user does not have (or does not want to take the time to enter) all of the final or concrete data with which to create the plan.

In an embodiment, the user can change the structured/freeform designation for each individual task at any time during the project planning. For example, if the designation is entered as another attribute of the task (see the "FF?" (freeform?) attribute field of FIG. 4), then the designation can be changed by entering a new value for the attribute (e.g., changing "N" to "Y" in FIG. 4). In other embodiments, however, the designation may be permanent once made.

An optional create operation, depicted in dashed lines, is designated at 310 in FIG. 3. The third create operation 310 provides the user with an opportunity to add additional attributes to the task. In an embodiment, the third create operation 310 provides a selection of predetermined attributes to the user and enables the user to select from these predetermined attributes. In other embodiments, however, the third create operation 310 can allow the user to define new attributes.

In general, a freeform task includes one or more freeform attributes. In some embodiments, the freeform attributes of a freeform task are predetermined. For example, when the first select operation 308 designates a given task as a freeform task, a predetermined set of attributes of the given task are automatically designated as freeform attributes.

In other embodiments, however, an optional second select operation 312 can enable the user to define one or more individual attributes within a freeform task to accept freeform input. Typically, the user selects only a subset of the attributes of a freeform task to define as freeform attributes. Alternatively, the user can define all or none of the attributes within a freeform task to be freeform attributes. Attributes within a structured task cannot be defined as freeform attributes. In an embodiment, the user can change this designation for each individual attribute at any time during the project planning. In other embodiments, however, the designation may be permanent once made.

A first generate operation 314 provides a data field for each attribute of each created task regardless of whether the attribute is a structured attribute or a freeform attribute. Each data field is configured to store a value for the respective attribute. If the attribute is a structured attribute, then the first data field is associated with recognition criteria (e.g., type of date to be entered, format of data to be entered, etc.) that must be met by any input data entered into the first data field. Alternatively, if the attribute is a freeform attribute, then the first data field is configured to accept any data input by the user.

If a structured task is created or if a freeform task having only structured attributes is created, then the generation process 300 can proceed to a stop module 318 at which the generation process 300 completes and ends. Alternatively, if the user wishes to create additional tasks or additional attributes, then the generation process 300 can cycle back to the second create operation 306 or the third create operation 310.

If a freeform task having at least one freeform attribute is created, however, then the generation process 300 proceeds to a second generate operation 316. The second generate operation 316 provides a second data field for each freeform attribute. The second data field is associated with the first data field of the respective freeform attribute such that data entered into the first data field may be entered automatically into the second data field under certain conditions. The second data field is associated with recognition criteria that must be met by any input data entered by the user into the second data field. The generation process 300 can then end or cycle back as described above.

FIG. 4 illustrates a schematic view of an example project plan 400 created using the generation process 300 of FIG. 3. The project plan 400 includes a first task 410, a second task 420, and a third task 430. Each task 410, 420, 430 includes a name attribute, a designation attribute, an attribute A, and an attribute B. Each attribute A, B of each task 410, 420, 430 is associated with at least a first data field 412, 414, 422, 424, 432, 434, respectively.

The first task 410, "TASK 1", of project plan 400 is designated as a freeform task. In addition, both of attributes A and B of the first task 410 are designated as freeform attributes. Accordingly, a second data field 416, 418 is associated with the attributes A, B, respectively, of the first task 410. The first data fields 412, 414 of the attributes A, B are configured to accept any data V1A, V1B, respectively, entered by the user. The second data fields 416, 418 of the attributes A, B, however, are configured to accept only structured input V1A', V1B', respectively.

The second task 420, "TASK 2", also is designated as a freeform task. Only attribute B, however, is designated as freeform attribute. Attribute A is designated as a structured attribute. Accordingly, a second data field 418 is associated with the attribute B of the second task 410. The first data fields 422 of the attribute A and the second data field 428 of the attribute B are configured to accept only structured input V2A', V2B', respectively. The first data field 424 of attribute B, however, is configured to accept any data V2B entered by the user. In an embodiment, the user can choose to transform attribute A into a freeform attribute during the planning process.

The third task 430, "TASK 3", is designated as a structured task. Accordingly, none of the attributes A, B is designated as a freeform attribute. The first data fields 432, 434 of the third task are configured to accept only structured data V3A', V3B', respectively. In order to enable the user to enter freeform data into the first data fields, the user would first need to designate the third task 430 as a freeform task. In an embodiment, the user would need to select which of the attributes of the third task 430 should be freeform attributes.

As shown in FIG. 4, project plans having freeform tasks and freeform attributes can store two sets of data simultaneously. One set of data represents the information input by the user. The other set of data represents data that is recognizable by and logical according to the calculation model of the project plan. Advantageously, storing two sets of data for freeform attributes enables the user to sketch out a plan using the data the user has available or fuzzy data while retaining the calculation model's ability to calculate interdependent attribute values.

In some embodiments, only the first set of data (i.e., the data actually entered by the user) is displayed to the user within the project management environment, such as project management environment 100 of FIG. 1. The second set of data is stored and tracked in the background of the project management environment. In other embodiments, both sets of data can be displayed simultaneously. Processes for displaying the first and second data sets are described in further detail herein.

Figure 5:
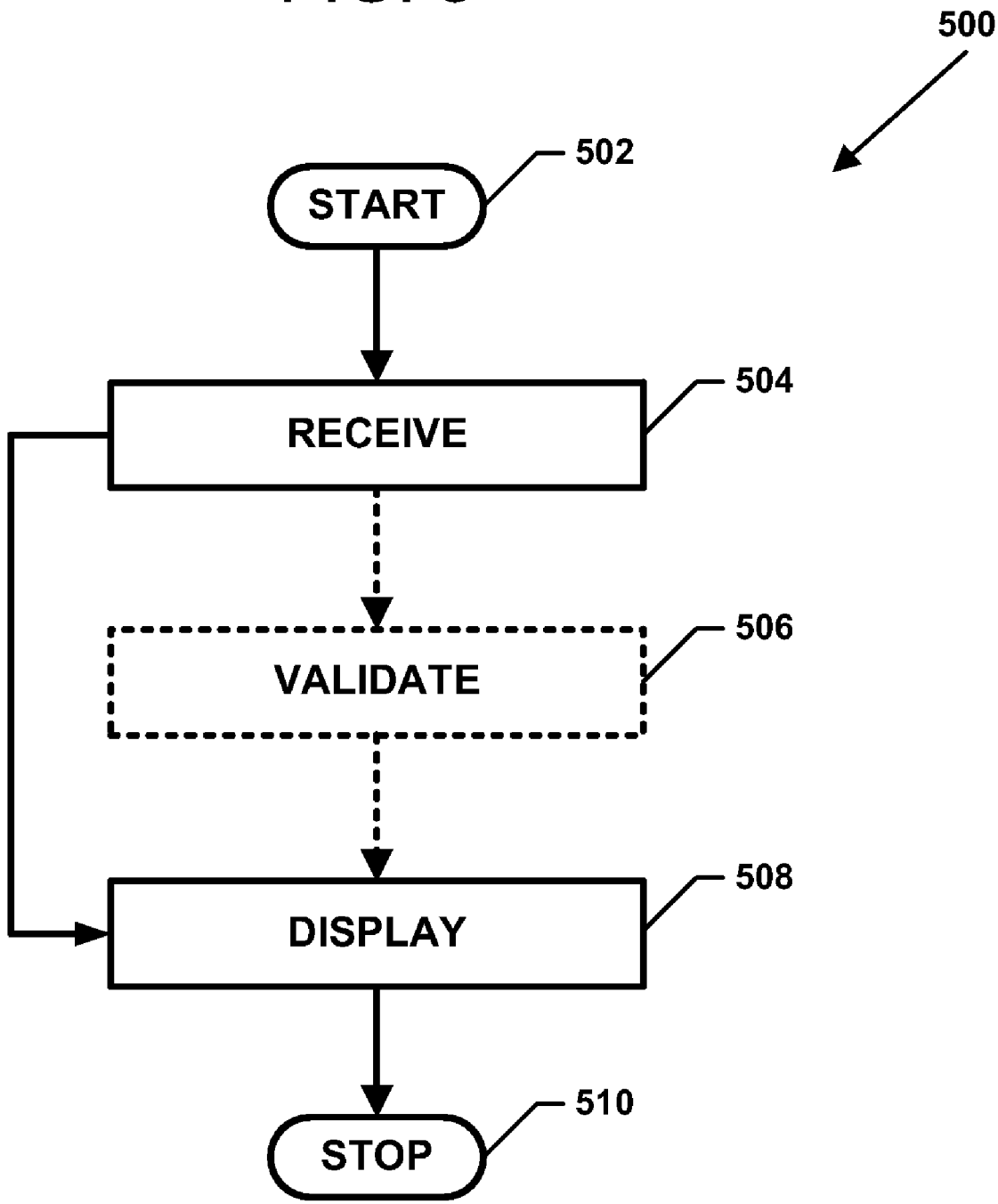
FIG. 5 illustrates a flowchart depicting a first population process to define a project plan viewable to the user, the creation process being performed in accordance with the principles of the present disclosure.
Figure 6:
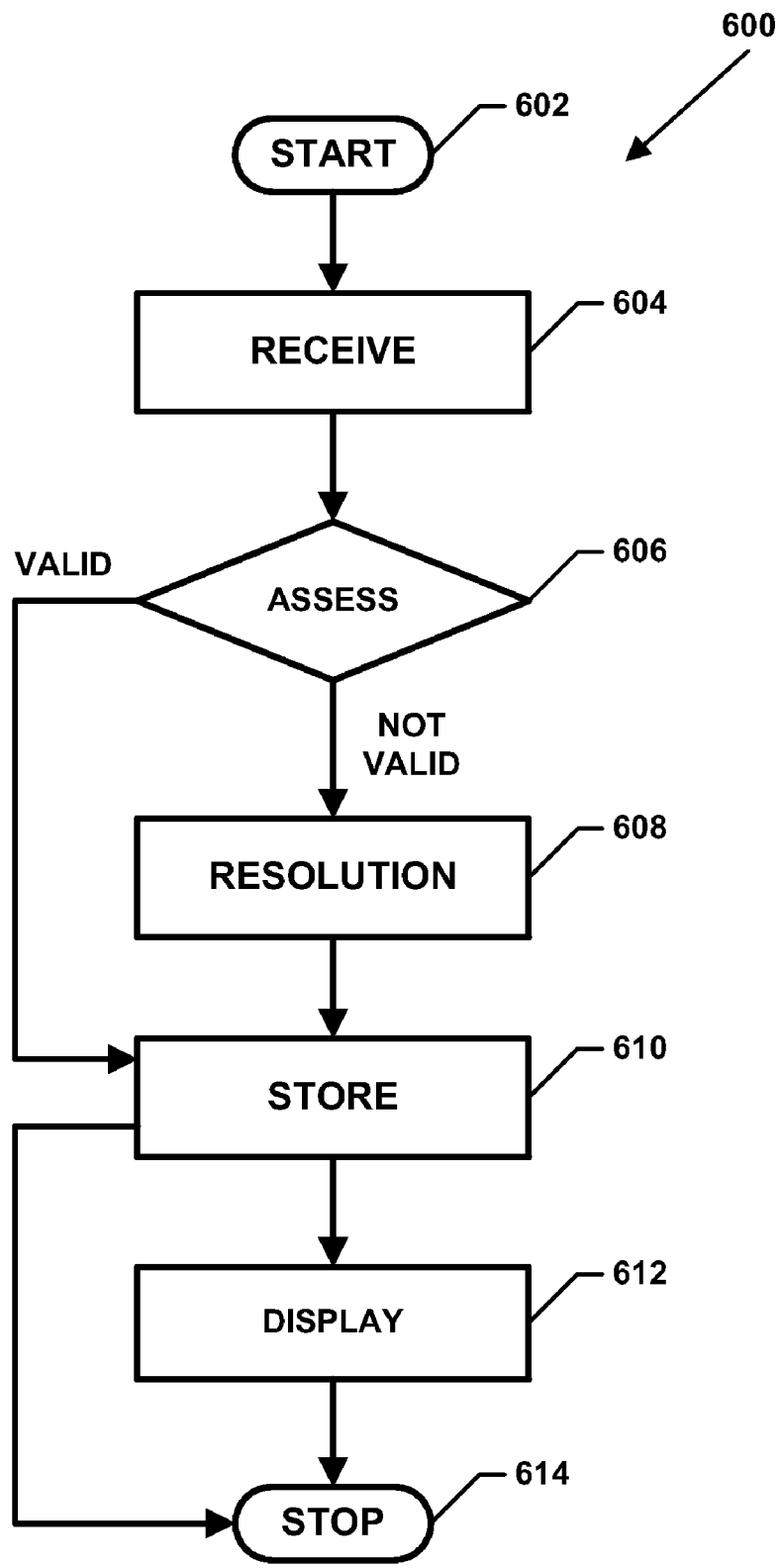
FIG. 6 illustrates a flowchart depicting a second population process to define a project plan, the second population process populating fields to be calculated in the background of the project management environment, the creation process being performed in accordance with the principles of the present disclosure.
Figure 7:
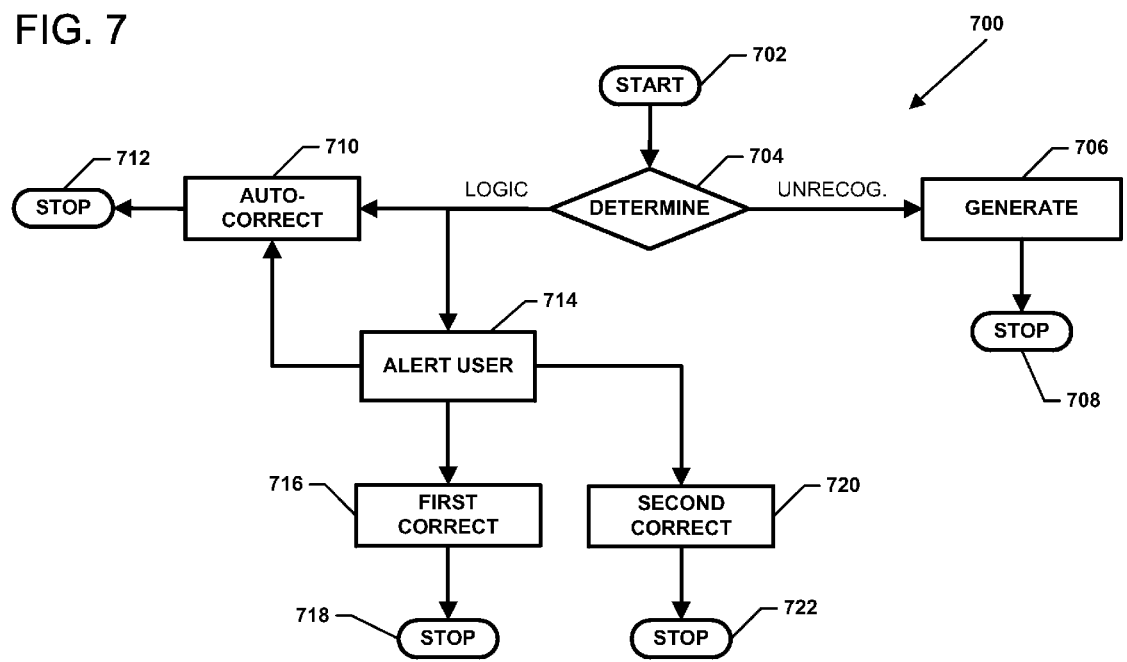
FIG. 7 illustrates a flowchart depicting a resolution process to resolve unrecognizable or logically inconsistent attribute values input by the user, the resolution process being performed in accordance with the principles of the present disclosure.

With reference to FIGS. 5-7, processes with which the user can define the project plan are disclosed. Embodiments of these processes can enable the user to assign freeform values to task attributes to generate a project sketch. Embodiments of these processes resolve conflicting attribute values in the background while displaying to the user whatever data was entered by the user. This conflict resolution enables the calculation model to aid the user in planning a project schedule and to track the evolution of the project plan as freeform data is replaced with structured data.

FIG. 5 illustrates an operation flow for a population process 500 by which the first fields associated with project attributes can be assigned values. The population process 500 initializes and begins at a start module 502 and proceeds to a receive operation 504. The receive operation 504 receives input from the user. For example, the receive operation 504 can receive input through a keyboard or other input device 230 of a computing device 200. Typically, the user enters the information in the input field 110 of the project management environment 100.

If the task is a structured task or has structured attributes, then a validation operation 506, depicted in dashed lines, can determine whether the input data accords with any recognition requirements associated with the respective first data field. For example, if the user enters data into a start date attribute of a structured task, then the validation operation 506 can determine whether the entered data is a date. In an embodiment, the validation operation 506 may determine if the input data is a date entered in a predefined date format (e.g., mm/dd/ccyy).

The validation operation 506 also can determine whether the input data accords with any logical requirements associated with the first data field. For example, the validation operation 506 can require that a start date occur before an end date. Accordingly, if the user enters a start date value of Jan. 15, 2007 and an end date value of Jan. 1, 2007, then the validation operation 504 can issue an error message and/or refuse to accept the input data.

Alternatively, if the user enters data for a freeform attribute, then the population process 500 can proceed directly from the receive operation 504 to a display operation 508. The display operation 508 provides the data entered into the first data fields to the user. For example, the display operation 508 can provide the values of the first data fields via a output device 235, for example, using a presentation process 1000, which will be described in detail herein with respect to FIG. 10. The population process 500 completes and ends at a stop module 510.

FIGS. 6 and 7 illustrates an operation flow for a second population process 600 and a resolution process 700 by which the second fields associated with freeform attributes can be assigned values. The second population process 600 initializes and begins at a start module 602 and proceeds to a receive operation 604. The receive operation 604 receives input from the user. For example, the receive operation 604 can be the same as the receive operation 504 of the first population process 500 (see FIG. 5).

A validation operation 606 can determine whether the input accords with any recognition requirements associated with the respective second data field. For example, if the user enters data into a duration attribute of a freeform task, then the validation operation 506 can determine whether the input indicates a period of time. In an embodiment, the validation operation 606 may determine whether the input is entered in a predefined input format (e.g., a number of days, a number of hours, etc.).

The validation operation 606 also can determine whether the input accords with any logical requirements associated with the second data field. For example, the validation operation 606 can require that only eight working hours can be scheduled in a work day. If the validation operation 606 determines the input meets all recognition requirements, then the second population process 600 proceeds to a store operation 610, which will be discussed in greater detail below.

Alternatively, if the validation operation 606 determines the input does not meet the recognition requirements or does not meet the logical requirements, then the second population process 600 proceeds to a resolution operation 608. The resolution operation 608 ascertains or establishes a recognizable and logical value for the freeform attribute. This ascertained value is assigned to the second data field of the attribute in the store operation 610 described below.

Some embodiments of the resolution operation 608 determine the value assigned to the second data field of the freeform attribute at least partially based on the data input by the user. Other embodiments of the resolution operation 608 determine the value assigned to the second data field of the freeform attribute at least partially based on the values of related attributes. Additional details pertaining to the resolution of unrecognizable and/or logically inconsistent attribute values are disclosed herein with reference to FIG. 7.

Continuing with FIG. 6, the store operation 610 stores the recognizable, logical value (i.e., the value input by the user or the value produced by the resolution operation 608) in the second data field of the respective attribute. A display operation 612 presents the data entered in the second data fields to the user. In certain embodiments, data stored in the second data fields are presented in a graphically distinct form from the data stored in the first data fields. Example display processes will be described in greater detail herein with respect to FIG. 10. The second population process 600 completes and ends at a stop module 614.

FIG. 7 illustrates an operation flow for one example resolution process 700 by which a recognizable and logical attribute value is generated from an unrecognizable or logically inconsistent attribute value. This resolution process 700 can be used to implement the resolution operation 608 of the second population process 600 of FIG. 6 to generate a freeform attribute value to be stored in the second data field of the freeform attribute. The resolution process 700 initializes and begins at a start module 702 and proceeds to a determine operation 704.

The determine operation 704 analyzes the attribute value input by the user to determine whether the data is unrecognizable or logically inconsistent. If the determine operation 704 determines the data is unrecognizable (e.g., a string of text when a date is expected), then the resolution process 700 proceeds to a generate operation 706. The generate operation 706 produces a recognizable and logically consistent attribute value based on related attributes. If no related attributes exist, then the generate operation 706 produces a default recognizable value.

Figure 8:
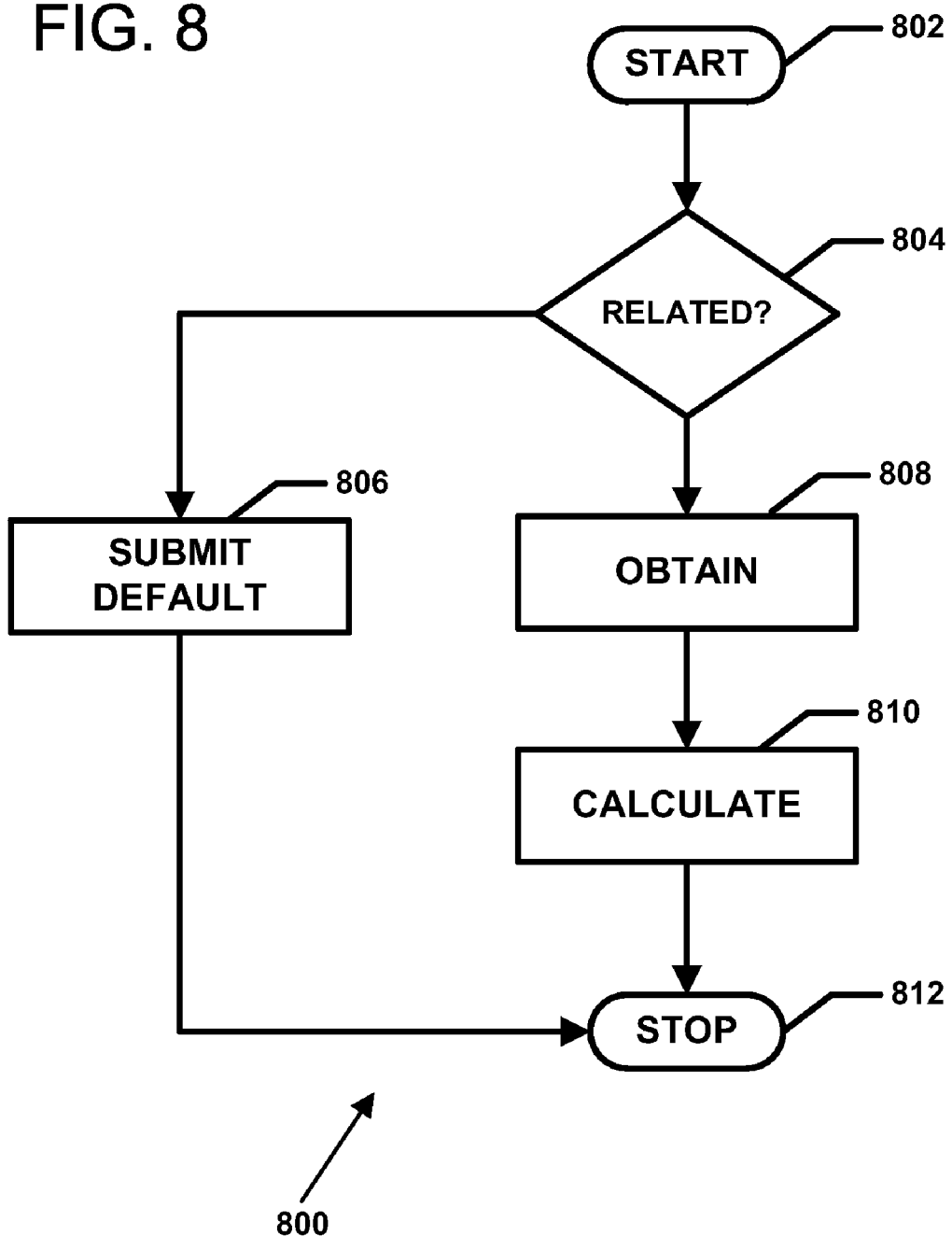
FIG. 8 illustrates a flowchart depicting a generate process to generate a consistent, recognizable attribute value, the generate process being performed in accordance with the principles of the present disclosure.

For example, FIG. 8 illustrates an example generation process 800 that can be used to implement the generate operation 706 of the resolution process 700 to produce a prospective attribute value. The generation process 800 initializes and begins at a start module 802 and proceeds to a decision module 804. The decision module 804 determines whether the prospective attribute value is related to a known value of any other attributes. For example, in an embodiment, the decision module 804 would determine that the value of a duration attribute is related to the value of a start date attribute and to the value of an end date attribute.

If the decision module 804 determines the prospective attribute value is not related to any other attribute value or that the attribute values to which the prospective attribute value is related have not been assigned yet, then the generation process 800 proceeds to a submit operation 806. The submit operation 806 passes a default value back to the generate operation 706 of the resolution process 700. The generation process 800 completes and ends at a stop module 814. The resolution process 700 then passes the default value back to the resolution operation 608 of the second population process 600 of FIG. 6, completes, and ends at a stop module 708.

Alternatively, if the decision module 804 determines the prospective attribute value is related to another known attribute value, then the generation process 800 proceeds to an obtain operation 808. The obtain operation 808 retrieves the value(s) of the related attribute(s). For example, in an embodiment, if the user had input unrecognizable data as a task duration, then the obtain operation 808 would retrieve the value of the task start date and the value of the task end date.

A calculate operation 810 determines the prospective attribute value based on the retrieved values of the related attributes. Continuing the example given above, the calculate operation 810 can compute the task duration by determining the number of days between the retrieved value of the task start date and the retrieved value of the task end date. Generally, the calculate operation 810 determines the prospective attribute value based on the retrieved values in accordance with rules of the project calculation model. For example, the calculate operation 810 can exclude weekend days from the task duration calculation if such a provision is included in the rules of the project calculation model.

The generation process 800 completes, ends at the stop module 812, and passes the prospective attribute value back to the generate operation 706 of the resolution process 700, which completes and ends at the stop module 708 as described above.

Continuing with the resolution process 700 of FIG. 7, the determine operation 704 can determine the attribute value input by the user is recognizable, but logically inconsistent. In some embodiments, the input data can be inconsistent with other, previously-entered attribute values. For example, the input data can schedule a project end date occurring before the project start date. In other embodiments, the input data can be inconsistent with definition rules stored in the calculation model. For example, the input date can indicate a project participant will work nine hours in one work day when the calculation model defines a workday as eight hours.

In some embodiments, if the determine operation 704 determines the attribute value input by the user is logically inconsistent, then the resolution process 700 proceeds to an auto-correct operation 710. The auto-correct operation 710 resolves the logical inconsistency created by the input attribute value.

In an embodiment, the auto-correct operation 710 determines a more consistent value of the attribute in place of the input value. In other embodiments, however, the auto-correct operation 710 determines a new value for one of the related attributes to resolve the inconsistency. Such embodiments advantageously reflect the intentions of the user more accurately by changing the project plan to conform to the data input most recently by the user.

Figure 9:
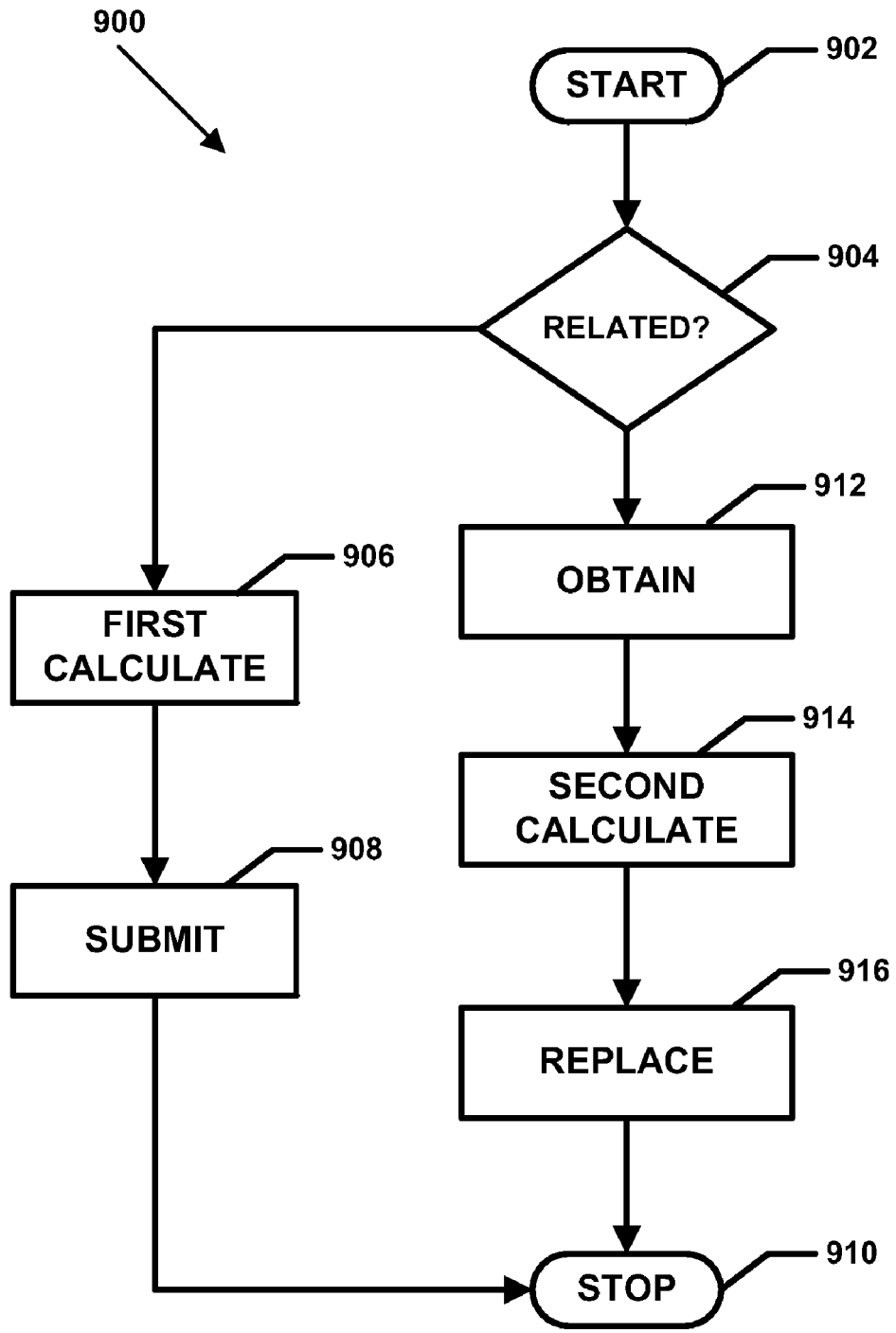
FIG. 9 illustrates a flowchart depicting an auto-correct process to generate a consistent, recognizable value for a related attribute, the auto-correction process being performed in accordance with the principles of the present disclosure.

An example correction process 900, according to which the auto-correct operation 710 can be implemented to obtain a valid attribute value, is shown in FIG. 9. The example correction process 900 initializes and begins at a start module 902 and proceeds to a decision module 904. The decision module 904 determines whether the input attribute value is related to a known value of any other attributes. For example, the decision module 904 can be the same as decision module 804 of the generation process 800 of FIG. 8.

If the decision module 904 determines the input attribute value is not related to any other attribute values or that the attribute values to which the input attribute value is related have not yet been assigned, then the correction process 900 proceeds to a first calculate operation 906. The first calculate operation 906 determines an attribute value in accordance with the definition of the task and the rules of the calculation model. In an embodiment, the first calculate operation 906 can determine the attribute value based on the value input by the user.

A submit operation 908 passes the calculated value back to the generate operation 706 of the resolution process 700. The correction process 900 completes and ends at a stop module 910. The resolution process 700 then passes the calculated attribute value back to the resolution operation 608 of the second population process 600 of FIG. 6, completes, and ends at a stop module 708 as described above.

Alternatively, if the decision module 904 determines the input attribute value is related to another known attribute value, then the correction process 900 proceeds to an obtain operation 912. The obtain operation 912 retrieves the value(s) of the related attribute(s). For example, the obtain operation 912 can be the same as the obtain operation 808 of generation process 800.

A calculate operation 914 determines an appropriate value for one or more of the related attribute values based on the input attribute value. For example, if a task is defined as starting on Jan. 1, 2007 and ending on Jan. 2, 2007 and the user subsequently inputs a duration value of 5 days, then one embodiment of the calculate operation 914 will calculate a new end date of Jan. 5, 2007.

A replace operation 916 substitutes the newly calculated value for the previous value of the related attribute. In an embodiment, the replace operation 916 inputs the newly calculated value into the first data field of the related attribute. In another embodiment, the replace operation 916 inputs the newly calculated value into a second data field of the related attribute.

The correction process 900 returns the newly calculated attribute value to the auto-correct operation 710 of the resolution process 700, completes, and ends at the stop module 910 as described above. The resolution process 700 passes the input attribute value back to the resolution operation 608 of the second population process 600 of FIG. 6, completes, and ends at a stop module 712.

Continuing with the resolution process 700 of FIG. 7, in alternative embodiments, the resolution process 700 can proceeds to an alert operation 714 (i.e., instead of the auto-correct operation 710) if the determine operation 704 determines the data is recognizable, but logically inconsistent. The alert operation 714 is typically used in place of the auto-correct operation 710. In other embodiments, however, features of the alert operation 714 can be used in cooperation with the auto-correct operation 710.

The alert operation 714 provides an indication to the user that the input attribute value has caused a logical inconsistency. For example, the alert operation 714 can actively pop-up a screen displaying a warning or explanation. In other embodiments, however, the alert user operation 714 can change the visual depiction (e.g., color, shape, icon, opaqueness, etc.) of the attribute value displayed in at least one of the input field 110 and the display field 120 of the project management environment 100 (FIG. 1).

The alert operation 714 provides the user with the opportunity to select one of three choices. Firstly, the user may choose to ignore the inconsistency, in which case the resolution process 700 proceeds to the auto-correct operation 710 to generate an appropriate value to store in the second data field of the freeform attribute. In such cases, the attribute value input by the user remains stored in the first data field. From the auto-correct operation 710, the resolution process 700 completes and ends as described above.

Secondly, the user may choose to modify the input attribute value, in which case the resolution process 700 proceeds to a first correction operation 716. The first correction operation 716 enables the user to modify not only the attribute value stored in the second data field of the freeform attribute, but also the attribute value stored in the first data field. In an embodiment, the user modifies the attribute value by entering a new value in the input field 110 or the display field 120 of the project management environment 100. From the first correction operation 716, the resolution process 700 passes the newly entered attribute value to the resolution operation 608 of the second populate process 600, completes, and ends at a stop module 718.

Thirdly, the user may choose to modify a related attribute value, in which case the resolution process 700 proceeds to a second correction operation 720. The second correction operation 720 enables the user to modify not only the attribute value stored in the second data field of the related attribute, but also the attribute value stored in the first data field of the related attribute. In an embodiment, the user modifies the related attribute value by entering a new value in the input field 110 or the display field 120 of the project management environment 100. From the second correction operation 720, the resolution process 700 passes the input attribute value to the resolution operation 608 of the second populate process 600, completes, and ends at a stop module 722.

In other embodiments, the alert operation 714 can be used before or instead of the generate operation 706 to resolve unrecognizable input data. In such embodiments, the alert operation 714 can indicate the input attribute value does not meet the recognition criteria associated with the respective attribute. For example, the alert operation 714 can actively pop-up a screen displaying a warning or explanation. After providing the indication, the resolution process 700 can receive a new attribute value from the user or can proceed to the generate operation 706 to obtain a recognizable attribute value.

Figure 10:
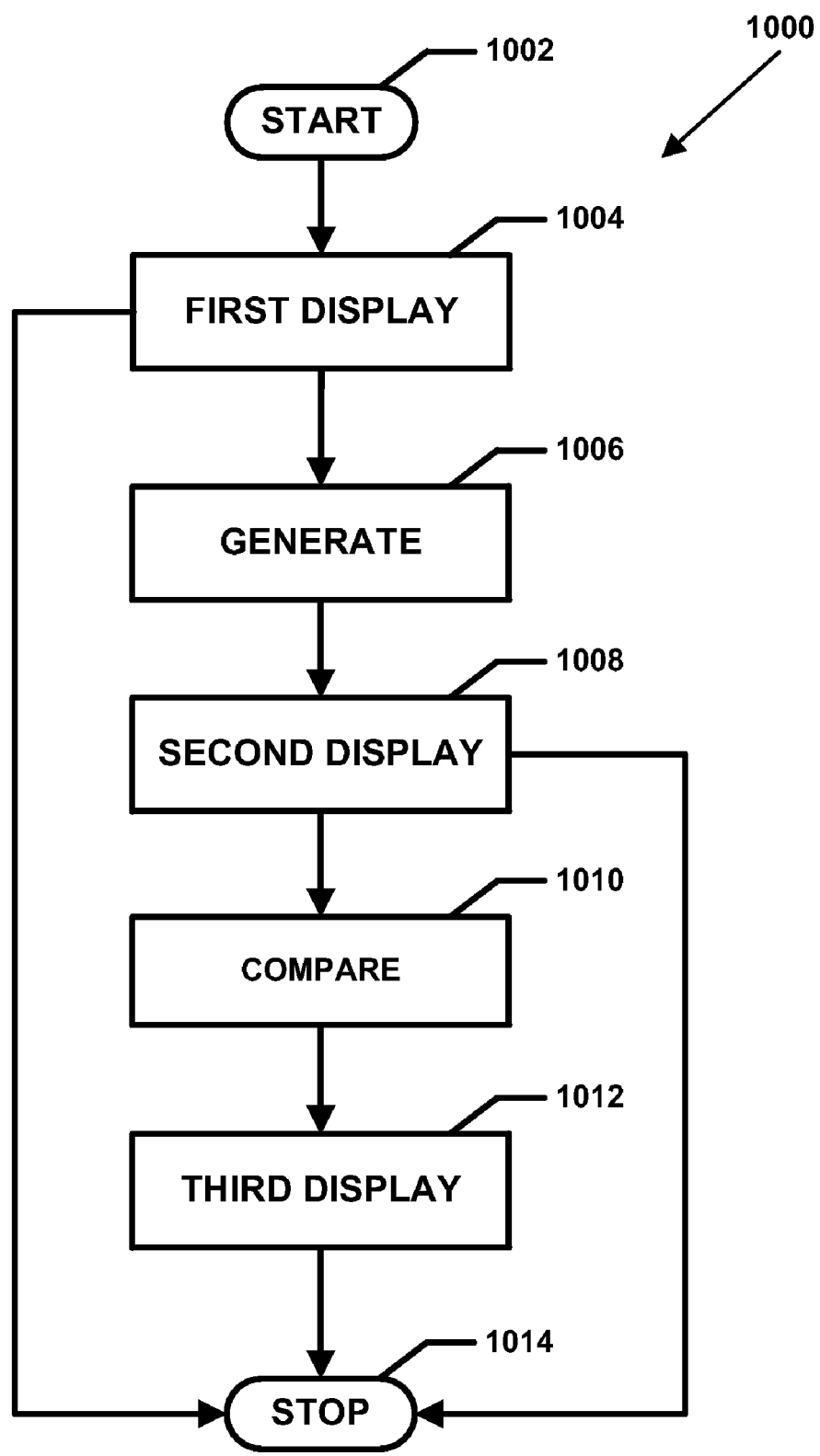
FIG. 10 illustrates a flowchart depicting a presentation process to display a project plan, the presentation process being performed in accordance with the principles of the present disclosure.

FIG. 10 illustrates an operation flow for an example presentation process 1000 by which all or part of a project plan can be displayed to the user. In an embodiment, the presentation process 1000 can be used to implement the display operations 508, 612 of the first and second populate processes 500, 600, respectively. In an embodiment, only the data stored in the first data fields of a project plan are presented to the user. In another embodiment, however, the data stored in the second data fields also or alternatively can be presented to the user.

The presentation process 1000 initializes and begins at a start module 1002 and proceeds to a first display operation 1004. The first display operation 1004 presents the values of each task attribute of the project data object in the input field 110 of a project management environment 100. For example, the first display operation 1004 can present the task attributes in a table format (see FIG. 1). In an embodiment, the first display operation 1004 presents only a subset of the tasks and/or attributes of the project data object.

In an embodiment, the first display operation 1004 graphically distinguishes the freeform tasks from the structured tasks so the user may know which tasks have been checked for logical consistency and which tasks have not. In other embodiments, the tasks are not distinguished on this basis. The presentation process 1000 can complete and end at a stop module 1014.

Alternatively, the presentation process 1000 can proceed to a generate operation 1006, which can generate a graphical representation of the project plan. For example, the generate operation 1006 can create a Gantt chart, a line graph, a timeline, or any other such display to represent the project plan. A second display operation 1008 presents the graphical representation of the project plan to the user in the display field 120 of the project management environment 100 (see FIG. 1).

In some embodiments, the presentation process 1000 can complete and end after the second display operation 1008. In other embodiments, however, the presentation process 1000 proceeds to a compare operation 1010. The compare operation 1010 determines the differences between the attribute values stored in the first data fields and the attribute values stored in the second data fields.

A third display operation 1012 indicates the differences to the user. For example, the third display operation 1012 can display the attribute values of the first data fields and the attribute values of the second data fields simultaneously so that the user may make a visual comparison between them. Alternatively, the third display operation 1012 also can indicate where the attribute values of the first and second data fields correspond.

Figure 11:
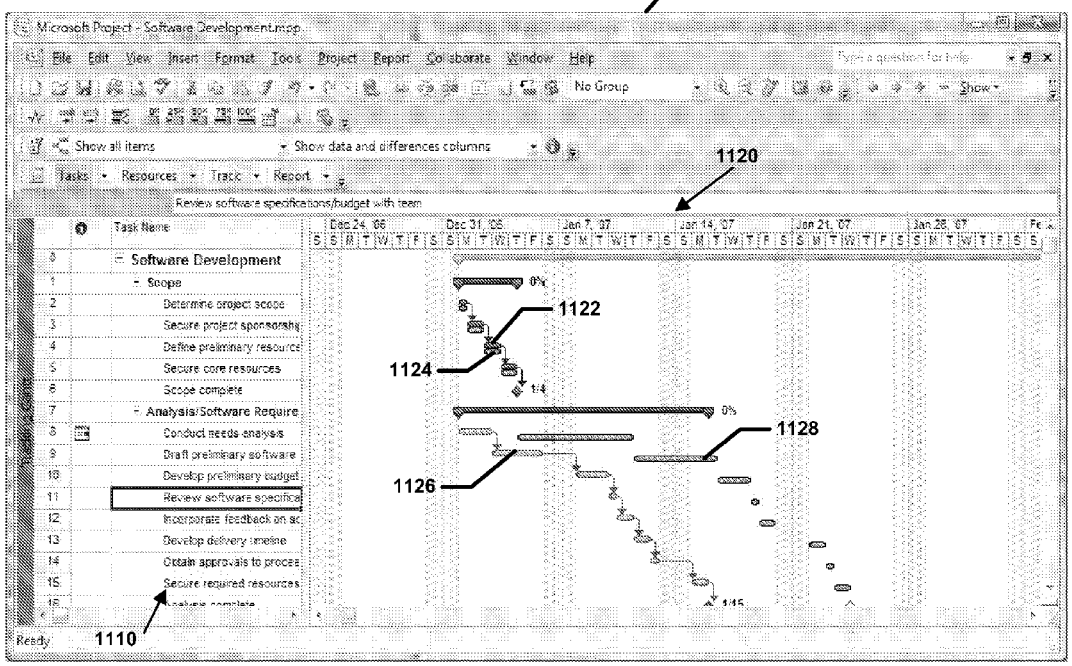
FIG. 11 illustrates a screen shot of a project management environment in which a project plan is displayed, the project plan including both first data fields and second data fields in accordance with the principles of the present disclosure.

For example, FIG. 11 is a screen shot of an example project management environment including an input field 1110 configured as a table and a display field 1120 configured as a Gantt chart including multiple bars representing tasks. In the example shown, the color of the bars indicates whether the bar represents the attribute values stored in the first data fields or the second data fields. The color of the bars also indicates whether the attribute values of the first and second data fields coincide. In other embodiments, however, such information can be communicated using the opacity of the bars, the shape of the bars, icons, or other such graphical indicia.

The Gantt chart of FIG. 11 includes a first bar 1122, a second bar 1124, a third bar 1126, and a fourth bar 1128. The first bar 1122 is blue, which indicates the bar represents the attribute values of the first data field and these attribute values correspond with the attribute values of the second data field. The third bar 1126 is red, which indicates the bar represents the attribute values of the first data field and these attribute values do not correspond to the attribute values of the second data field. The second and fourth bars 1124, 1128 are gray, indicating the bars represent the attribute values of the second data fields.

In the example shown, the bars representing the second data fields are shown beneath the bars representing the first data fields. In other embodiments, however, the bars can be shown in any order. Because the attribute values of the first and second data fields correspond, the first bar 1122 and the second bar 1124 are coterminous. Inversely, because the attribute values of the first and second data fields differ, the third bar 1126 and the fourth bar 1128 are not coterminous. In fact, in the example shown, the fourth bar 1128 does not even overlap the third bar 1126. The presentation process 1000 completes and ends at the stop module 1014 as described above.

The principles disclosed above can be used to enable creation and manipulation of project plans using a mixture of freeform and structured input. These principles can be understood best through a set of example applications. FIGS. 12-15 illustrate sequential states of project plans 1200, 1300, 1400, 1500, respectively, as they are modified by a user. The first project plan 1200, shown in FIG. 12, includes a structured task, TASK 1, having three states T1, T2, T3. The structured task, TASK 1, includes a name attribute, a designation attribute, a start date attribute, an end date attribute, and a duration attribute. Because TASK 1 is a structured task, all of the attributes are structured attributes.

In the first state T1, the start date attribute has been assigned a value of Jan. 1, 2007, the end date attribute has been assigned a value of Jan. 2, 2007, and the duration attribute has been assigned a value of 2 days. In the second state T2, the user modifies the duration attribute by replacing the previous value with a new value of 5 days. In the third state T3, the calculation model of the project plan updates related attributes to conform to the newly entered input. In the example shown, the value of the end date attribute is changed to Jan. 5, 2007.

In contrast, the second project plan 1300, shown in FIG. 13, includes a freeform task, TASK 2, having three states U1, U2, U3. The freeform task, TASK 2, also includes a name attribute, a designation attribute, a start date attribute, an end date attribute, and a duration attribute having the same initial values in the first state U1 as the attributes of the structured task, TASK 1, had in the first state T1. The start date attribute, end date attribute, and duration attribute have been designated as freeform attributes and, therefore, have second data fields (designated with dashed lines) associated with the first data fields.

When the same modification is made to the second project plan 1300 in the second state U2, the attribute value of the first data field of the duration attribute changes to reflect the newly entered data (i.e., 5 days). Because the newly entered data is recognizable to the calculation model (e.g., is the type of data expected by the calculation model for that attribute), the newly entered data also is stored in the second data field of the duration attribute.

However, unlike with the first project plan 1200, the first data field of the end date attribute of the second project plan 1300 is not updated to reflect the newly modified duration value. Rather, the inconsistent date of Jan. 2, 2007 is retained. The calculation model does, however, update the second data field of the end date attribute with a logically consistent value (i.e., Jan. 5, 2007).

The third project plan, shown in FIG. 14, includes a freeform task, TASK 3, having the same attributes as the previous tasks TASK 1, TASK 2 and two data states V1, V2. In the initial state V1, the user enters logically inconsistent values for the attributes (e.g., an end occurring four days after the start date and a project duration of 1 day). These logically inconsistent values are stored in the first data fields and displayed to the user. The second data fields can store default values or can remain empty.

In the second state V2, the calculation model resolves the logical inconsistency and stores a set of logically consistent dates in the second data fields. In the example shown, the duration attribute value was entered last, so the other attribute values are changed to be consistent with the entered duration value. In other embodiments, however, the calculation model may base the resolution on different attribute values. In the example shown, the first data fields store the input values. In other embodiments, however, the resolved attribute values can be entered and stored in the first data fields.

The fourth project plan, shown in FIG. 15, includes a freeform task, TASK 4, having the same attributes as the previous tasks TASK 1, TASK 2, TASK 3 and two project states W1, W2. In the initial state W1, the user enters an unrecognizable value for the start date attribute (i.e., FY07) and recognizable values for the end date attribute and duration attribute. Because these attributes are freeform attributes, these values are stored in the first data fields and displayed to the user regardless of whether the calculation model can recognize the values.

In the second state V2, the recognized values are stored in the second data fields of the respective attributes. With respect to the unrecognized value, however, the calculation model determines a new value for the start date attribute (e.g., Jun. 30, 2007) that is consistent with the recognized values. In the example shown, the calculation model computes the start date value by counting back 6 months (i.e., the value of the duration attribute) from the end date attribute value of Dec. 31, 2007.

Embodiments of the disclosure may be implemented as a computer process (method), a computing system, or as an article of manufacture, such as a computer program product or computer readable media. The processes (programs) can be implemented in any number of ways, including the structures described in this document. One such way is by machine operations, of devices of the type described in this document. Another optional way is for one or more of the individual operations of the methods to be performed on a computing device in conjunction with one or more human operators performing some of the operations. These human operators need not be collocated with each other, but each can be only with a machine that performs a portion of the program.

The computer program product may be a computer storage media readable by a computer system and encoding a computer program of instructions for executing a computer process. The computer program product may also be a propagated signal on a carrier readable by a computing system and encoding a computer program of instructions for executing a computer process. The term computer readable media as used herein includes both storage media and communication media.

Those skilled in the art will appreciate that the disclosure may be practiced with other computer system configurations, including hand-held devices, multiprocessor systems, microprocessor-based or programmable consumer electronics, minicomputers, mainframe computers, and the like. The disclosure may also be practiced in distributed computing environments where tasks are performed by remote processing devices that are linked through a communications network. In a distributed computing environment, program modules may be located in both local and remote memory storage devices. Generally, program modules include routines, programs, components, data structures, and other types of structures that perform particular tasks or implement particular abstract data types.

We claim:

1. A method of creating a project plan on an electronic computing device, the method comprising:
receiving instructions at the electronic computing device to create a task for the project plan, the project plan having a plurality of tasks, the project plan comprising a plurality of rows and columns, each row of the project plan corresponding to a unique task, each row of the project plan including a designation field, a start date field and a completion date field, the designation field comprising one letter character that designates a task as being either a freeform task or a structured task, the designation field being set to a "Y" for a freeform task and to a "N" for a structured task, at least two of the columns corresponding to attributes for the plurality of tasks, the designation of a task as a freeform task permitting the attributes for the task to be either freeform attributes or structured attributes, the designation of a task as a structured task requiring each attribute for the task to be a structured attribute, a freeform attribute being capable of accepting freeform input, a structured attribute requiring structured input, two data fields being associated with each freeform attribute, the first data field of the two data fields storing a freeform representation of the freeform attribute, the second data field of the two data fields storing a structured representation of the freeform attribute, the designation field permitting a freeform task to be changed to a structured task by changing the designation field from a "Y" to a "N", the change of the freeform task to a structured task requiring that all freeform attributes for the freeform task be converted to structured attributes, the created task being a freeform task, the freeform task having a plurality of attributes;
generating a first data field at the electronic computing device for each of the attributes of the freeform task;
obtaining a designation for each attribute of the freeform task at the electronic device, including obtaining a designation of a subset of the attributes of the freeform task as freeform attributes and a designation of the remaining attributes of the freeform task as structured attributes; and
generating a second data field at the electronic computing device for each of the freeform attributes of the freeform task and associating each of the second data fields with the first data field of the respective freeform attribute, the second data field storing a structured representation of the data in the first data field.

2. The method of claim 1, wherein obtaining a designation of each attribute comprises obtaining a designation of a predetermined subset of attributes of the freeform task as freeform attributes.

3. The method of claim 1, further comprising:
receiving a value of each attribute of the freeform task; and
storing the received value in the first field of each respective attribute.

4. The method of claim 3, further comprising:
determining whether the received value of each freeform attribute is structured;
storing the value of the freeform attribute in the respective second field of the freeform attribute if the value is structured;
determining a structured value of the freeform attribute if the value is not structured; and
storing the structured value of the freeform attribute in the respective second field of the freeform attribute.

5. The method of claim 4, further comprising:
determining a related attribute of the first freeform attribute, the related attribute having a value; and
calculating the structured value based at least in part on the value of the related attribute.

6. The method of claim 3, further comprising:
determining a related attribute for each attribute of the freeform task; and
determining whether the received value of each attribute of the freeform task is logically inconsistent with a value of the related attribute.

7. The method of claim 6, further comprising:
calculating a logically consistent value for the related attribute based at least in part on the received value when the received value is logically inconsistent; and
assigning the calculated, logically consistent value to the second field of the related attribute.

8. The method of claim 7, further comprising:
providing an alert that the received value is logically inconsistent with the value of the related attribute.

9. The method of claim 8, further comprising:
providing an opportunity to provide a logically consistent value in place of the received value.

10. The method of claim 8, further comprising:
providing an opportunity to provide a logically consistent value for the related attribute.

11. A system for planning a project, the system comprising:
a processing unit;
system memory storing instructions that, when executed by the processing unit, cause the processing unit to create:
a project plan, the project plan including at least a first task, the first task having a field that designates that the first task is either a freeform task or a structured task, the field being set to the letter "Y" when the first task is designated as a freeform task and the field being set to the letter "N" when the first task is designated as a structured task, the first task having a plurality of attributes, one of the attributes corresponding to the field that indicates whether the task is a freeform task or a structured task, wherein when the attribute designating whether the task is a freeform task or a structured task designates a freeform task, one or more task attributes are freeform attributes and the remainder of the plurality of attributes are structured attributes, each freeform attribute being capable of accepting freeform input, each structured attribute requiring structured input, the freeform task including:
a first data field in which a first attribute value can be stored, the first data field being associated with a first attribute of the freeform task; and
a second data field in which a second attribute value can be stored, the second attribute value being a structured value, the second data field being associated with the first data field, the second data field storing a structured representation of the data in the first data field;
wherein, when a new attribute value is entered in the first data field, the new attribute value is stored in the second data field if the new attribute value is a structured value and a structured representation of the new attribute value is stored in the second data field if the new attribute value is not a structured value;
wherein when the attribute designating whether the task is a freeform task or a structured task designates a structured task, each task attribute is required to be a structured attribute.

12. The system of claim 11, further comprising:
a first set of data fields in which attribute values can be stored, each data field of the first set being associated with one of the attributes of the first task; and
a second set of data fields in which structured attribute values can be stored, the second set of data fields having equal or fewer data fields than the first set, each data field of the second set being associated with one of the data fields of the first set.

13. The system of claim 12, further comprising:
an input field, the input field configured to display the attribute values stored in at least the first set of data fields; and
an output field, the output field configured to display a graphical representation of at least some of the attribute values stored in the first set of data fields.

14. The system of claim 13, wherein the input field is configured to display the attribute values stored in the first set of data fields in a table format.

15. The system of claim 13, wherein the output field is configured to display the attribute values in a Gantt chart.

16. The system of claim 12, wherein the output field is configured to display a graphical representation of at least some of the attribute values stored in the second set of data fields simultaneously with the display of the graphical representation of the attribute values stored in the first set of data fields.

17. A computer-readable storage medium comprising instructions that, when executed by an electronic computing device, cause the electronic computing device to:
receive instructions to create a freeform task, the freeform task including a field that displays a designation that the task is a freeform task, the designation being the letter "Y" for the freeform task, the freeform task having a plurality of attributes;
generate a first data field for each of the attributes of the freeform task;
obtain a designation for each attribute of the freeform task, including obtaining a designation of a subset of the attributes of the freeform task as freeform attributes, which accept freeform input, and a designation of the remaining attributes of the freeform task as structured attributes, which require structured input;
generate a second data field for each of the freeform attributes and associating each of the second data fields with the first data field of the respective freeform attribute;
receive a value of each attribute of the freeform task;
store the received value in the first field of each respective attribute;
determine a structured value of a freeform attribute if the received value is not structured;
store the structured value of the freeform attribute in the respective second field of the freeform attribute;
determine a related attribute for each attribute of the freeform task;
determine whether the received value of each attribute of the freeform task is logically inconsistent with a value of the related attribute, at least a first attribute of the freeform task being a date attribute and at least a second attribute of the freeform task being a time duration attribute;
calculate a logically consistent value for the related attribute based at least in part on the received value when the received value is logically inconsistent; and
assign the logically consistent value to the second field of the related attribute.

18. The method of claim 17, further comprising:
providing an alert that the received value is logically inconsistent with the value of the related attribute.

19. The method of claim 18, further comprising:
providing an opportunity to provide a logically consistent value in place of the received value.

20. The method of claim 18, further comprising:
providing an opportunity to provide a logically consistent value for the related attribute.

* * * * *